United States Patent
Cerofolini

(10) Patent No.: US 7,458,935 B2
(45) Date of Patent: Dec. 2, 2008

(54) METHOD AND APPARATUS FOR TRANSMITTING ULTRASOUND PULSES AND RECEIVING ECHO SIGNALS AT A HARMONIC OF THE TRANSMISSION FREQUENCY

(75) Inventor: Marino Cerofolini, Subbiano (IT)

(73) Assignee: Esaote, S.p.A., Casale Monferrato (IT)

( * ) Notice: Subject to any disclaimer, the term of this patent is extended or adjusted under 35 U.S.C. 154(b) by 878 days.

(21) Appl. No.: 10/217,779

(22) Filed: Aug. 13, 2002

(65) Prior Publication Data
US 2003/0036704 A1   Feb. 20, 2003

(30) Foreign Application Priority Data
Aug. 14, 2001 (IT) .......................... SV2001A0030

(51) Int. Cl.
*A61B 8/00* (2006.01)

(52) U.S. Cl. .................. 600/437; 600/447; 600/458

(58) Field of Classification Search ............... 600/407, 600/420, 437, 443, 447, 458, 468; 382/131
See application file for complete search history.

(56) References Cited

U.S. PATENT DOCUMENTS

| | | | | |
|---|---|---|---|---|
| 5,081,993 A | * | 1/1992 | Kitney et al. ............... 600/455 |
| 5,523,058 A | * | 6/1996 | Umemura et al. ........... 422/128 |
| 5,632,277 A | * | 5/1997 | Chapman et al. ........... 600/443 |
| 5,706,819 A | | 1/1998 | Hwang et al. .......... 128/662.02 |
| 5,833,614 A | | 11/1998 | Dodd et al. ................ 600/447 |
| 5,902,243 A | | 5/1999 | Holley et al. .............. 600/443 |
| 6,050,947 A | | 4/2000 | Rhyne et al. ............... 600/447 |
| 6,104,670 A | * | 8/2000 | Hossack et al. ................ 367/7 |

FOREIGN PATENT DOCUMENTS
EP   0 770 352 A1   5/1997

OTHER PUBLICATIONS
Calliada et al. Ultrasound contrast agents Basic principles. European Journal of Radiology 27 (1998) S157-S160.*

* cited by examiner

*Primary Examiner*—Eric F Winakur
*Assistant Examiner*—Baisakhi Roy
(74) *Attorney, Agent, or Firm*—Woodard, Emhardt, Moriarty, McNett & Henry LLP

(57) ABSTRACT

A method for transmitting ultrasound pulses and receiving echo signals at a harmonic of the transmission frequency includes the steps of generating a signal for exciting a transducer to transmit at least one ultrasound pulse at a basic transmission frequency and receiving the reflection echo of said pulse at a harmonic of the frequency of the transmitted pulse, any contributions to the harmonic frequency being removed or attenuated in the signal for exciting pulse transmission, characterized in that the signal for exciting the transducer/s is filtered or coupled thereto via a resonant circuit which is calibrated to the basic frequency. In combination therewith or alternatively thereto, the method includes a resonant circuit for additional coupling with a receiver. Included is an apparatus for transmitting ultrasound pulses and receiving echo signals at a harmonic of the transmission frequency, particularly an ultrasound imaging probe and an ultrasound imaging machine.

8 Claims, 2 Drawing Sheets

METHOD AND APPARATUS FOR TRANSMITTING ULTRASOUND PULSES AND RECEIVING ECHO SIGNALS AT A HARMONIC OF THE TRANSMISSION FREQUENCY

REFERENCE TO RELATED APPLICATION

The present patent application claims foreign priority benefits under 35 U.S.C. §119 to Italian patent application No. SV2001A000030, filed Aug. 14, 2001, now pending.

BACKGROUND OF THE INVENTION

The present invention relates generally to a method for transmitting ultrasound pulses and receiving echo signals at a harmonic of the transmission frequency including the steps of generating a signal for exciting a transducer to transmit at least one ultrasound pulse at a basic transmission frequency and the steps of receiving the reflection echo of said pulse at a harmonic of the frequency of the transmitted pulse, any contributions to the harmonic frequency being removed or attenuated in the signal for exciting pulse transmission. Included as part of the present invention is an apparatus for practicing the described method.

In ultrasound imaging machines operating in the harmonic imaging mode, signal generators are provided for exciting an array of transducers to transmit ultrasonic pulses at a certain frequency. The ultrasonic pulses transmitted at a certain basic frequency toward a body under examination are backscattered and the transducers are used as sensors for receiving the reflected echo signals at a harmonic of the basic frequency of the transmitted pulses, typically at the second harmonic frequency, the electric signals generated by said transducers being provided to a receiver.

This ultrasound imaging mode is very useful when contrast agents are used for valid diagnostic imaging of spontaneous flows of body fluids, such as blood flows or the like, which are poorly echogenic. Unlike substantially stationary tissues, which have an echogenic behavior, contrast agents have a nonlinear reflection behavior, hence the backscattered echo signals have harmonic frequencies, especially corresponding to the second harmonic of the basic frequency of the transmitted pulses. Therefore, the reflection contributions provided by fluid flows in which contrast agents are injected may be distinctly separated, with no risk for the latter to be dazzled by the reflection signals of stationary tissues, which have definitely higher intensities.

Nevertheless, transmitted pulses are currently not completely pure, but include harmonic components. This is partly due to the specific characteristics of the generator-transducer assembly, and partly to the fact that, even when pure sinusoidal waves are provided, pulse formation, i.e. the time cut of the waveform or time limit thereof, necessarily causes the generation of such spectra as to include harmonic frequencies. The presence of components whose frequencies correspond to at least one harmonic, and particularly to the second harmonic of the basic frequency in the transmitted pulses causes the echo signals to be distorted by said components. Therefore, there is the need to remove or drastically attenuate all components having harmonic frequencies in the transmitted signals.

It is known from U.S. Pat. No. 5,833,614 (issued Nov. 10, 1998 to Dodd et al.) to superpose the transmission signal provided by the generator to the transducer with an additional signal or pulse for attenuating or removing the harmonic components, for instance a pulse with the same profile as a Gaussian curve having the maximum at the basic frequency. This signal must be specially generated and superposed in a synchronized manner.

Nevertheless, this is a highly complex system which requires linear pulsers, therefore it is expensive and has a low electrical performance, which makes it incompatible with small and/or low-cost apparatuses.

Therefore, the present invention has the object of providing a method and an apparatus as described hereinbefore which, by simple and inexpensive arrangements, allow to remove any harmonic components in the transmitted pulses without using linear pulsers and to remove spurious harmonic components introduced upon reception of echo signals in a manner that is substantially independent from the type of probe in use and anyway not requiring complex and difficult adaptation methods.

The present invention achieves the above purposes by providing a method as described herein, in which the signal for exciting the transducer/s is filtered or coupled thereto through a resonant circuit calibrated to the basic frequency.

Particularly, a resonant circuit for coupling to the generator is generated, which upon transmission, resounds at the basic frequency of the transmitted pulses.

Alternatively thereto or in combination therewith the present invention provides that the transducer/s are filtered or coupled to the receiver through a resonant circuit which is calibrated to the receive harmonic frequency, particularly to the second harmonic of the basic frequency of the transmitted pulse.

A resonant circuit is actually provided which, upon reception, resounds at the predetermined harmonic frequency, particularly at the second harmonic frequency.

According to an improvement, the method of the present invention provides the use, as a transmitting resonant circuit, of the assembly composed of the transducer/s and the cable connecting it to a transmitter which generates electric pulses for exciting the transducer/s, the resonance frequency being adjusted to the basic frequency by inserting an inductance in series between the connecting cable and the transmitter.

Since the inductance value for determining the resonance frequency is determined by specific electric characteristics of the probe assembly, composed of the transducers and the connecting cable, the inductance may be appropriately selected for each type of probe and be mounted in advance on the cable or the probe itself.

The above is based on the acknowledgement that the cable-probe assembly actually is a resonant circuit having measurable capacitance and resistance values. Therefore, for each probe-cable combination, it is possible to determine the inductance value required to calibrate the resonant circuit to the basic frequency. The behavior of the resonant circuit is independent from the generator or transmitter, as the transmitter actually is a low-impedance generator.

According to a further improvement, regarding the receiving resonant circuit, the latter consists of the receiver itself which, upon reception, operates like a resonant circuit having predetermined resistance and capacitance values, whereas the cable-transducer or transducers/cable assembly behaves like a low to medium impedance generator.

As provided for transmission tuning, a tuning inductance is also provided upon reception.

Here, the analysis of typical resistance and parasitic capacitance values of receivers surprisingly showed that the same tuning inductance used to calibrate the transmitting resonant circuit may be used for the receiving resonant circuit.

In fact, the parasitic capacitance was generally found to be sufficient to cause the receiving resonant circuit to be properly tuned to the second harmonic frequency in combination with the inductance for tuning the transmitting resonant circuit.

However, if the parasitic capacitance of the receiver combined with the tuning inductance value provided for the transmit circuit is not suitable for tuning the receiving resonant circuit to the frequency of the selected harmonic, particularly of the second harmonic, a compensating capacitor may be provided, parallel to the parasitic capacitance of the receiver.

In this case, the sum of the parasitic capacitance of the receiver and of the compensating capacitance is selected as a quarter of the total capacitance of the probe-cable, or transducer/s-cable assembly, and the compensating capacitor does not affect the behavior of the transmitting resonant circuit.

Regarding the need to have a resonant circuit in the receiving chain, it shall be noted that, although the provision of this resonant circuit is certainly desirable, the latter is not so critical as for the transmitting resonant circuit. In fact, the transmitted pulses are already intrinsically free or substantially free of harmonic components, hence the generation of artifacts due to said components of the transmitted pulses is already widely suppressed or attenuated. Nevertheless, the presence of a resonant circuit properly tuned to the second harmonic is advantageous both to further limit the harmonic components due to parasitic processes and to cause, already upon reception, the basic band reflection signal to be filtered, without using or substantially limiting the procedures to extract, upon reception, the second harmonic signal from the reflected signals which obviously contain relatively high power or intensity components at the basic frequency. Although, when a compensating capacitor is provided, the latter is to be optimized based on the capacitance of the transducer/s-cable assembly and on the parasitic capacitance of the receiver, it should be understood that the generators typically have substantially similar constructions and in most cases, the parasitic capacitances are substantially identical and of the same order of magnitude. Anyway, even when the latter were not true, compensating capacitor are relatively easily adaptable, by using a variable capacitor, e.g. manually controlled for tuning and/or automatically set by the machine thanks to an automatic procedure for determining electric values through direct measurement by the ultrasound imaging machine or by plug-and-play protocols, whereby the relevant data of the probe or transducer or transducers-cable assembly and/or the data of the receiver are stored in a special portion of the memory associated to one of the components of the probe-cable assembly and/or of the receiver.

This mode also provides the opportunity to obtain an automatic tuning system which, by reading the technical electric characteristics of the probe-cable assembly and/or of the receiver, controls either a variable inductance or a variable compensating capacitor to achieve the optimized tuning conditions as better specified above.

Alternatively to the above, the type of probe-cable assembly may be also recognized with the help of tables stored in the apparatus, which provide information on said assembly associated to a probe identification code. In this case, the probe may be selected manually, based on the name or identification code thereof, or the assembly has the identification code stored therein so that, upon connection, the apparatus reads the identification code provided by the probe, finds the corresponding table of characteristics and sets the inductance and possibly the compensating capacitor based on the characteristics defined in the table.

A system might be also provided, whose operation is identical to loading of drivers for computer peripheral devices. In this case, a readable storage medium is provided with the probe, such as a floppy disk, a CD-Rom, a batchcard or the like, the apparatus including a reader of the storage medium. A special system including a dedicated microprocessor or the processing unit itself of the ultrasound imaging machine and at least one memory or memory area dedicated to the storage of tables of characteristics, transfers data from the reader to said memory or memory area by using it according to a set-up program for automatically setting inductance and possibly compensating capacitor to the proper values for the probe-cable assembly. The procedure is substantially the same as is used to load peripheral drivers in computers.

Obviously, besides the above, other automatic or semiautomatic modes may be provided to recognize the probe-cable assembly and to set tuning inductances and compensating capacitors.

In accordance with a further improvement, the present invention provides the combination of a frequency filtering process upon transmission and/or reception of ultrasonic transmitted pulses and reflection echoes respectively, by using a multiple pulse imaging technique, which provides that image data is obtained by combining the reflected echoes of at least two successive identical transmitted pulses focused along the same line of view. These combinations may be a difference between the reflection echoes provided by two identical transmitted pulses or a sum of two successive transmitted pulses, which are inverted, i.e. 180° dephased, like in the Pulse Inversion technique.

The above mentioned combination arranges the transducer/s, or the probe to be coupled, through a resonant circuit, to the transmitter and/or the receiver, and at least two successive identical or inverted transmitted pulses, in which reflection echoes are subtracted or added respectively, image data being obtained from said difference or sum signal.

The combined use of the method of the invention with the above multiple pulse modes generates a synergistic effect which allows to obviate the drawbacks of multiple pulse modes and to improve the method of this invention.

In fact, the coupling through resonant circuits appropriately calibrated for transmission and reception has the advantage of providing a frequency filtering action on the reflection echoes, aimed at extracting the harmonic component and particularly the second harmonic component of echoes, thus being a very simple method of extracting the reflection signals caused, for instance, by contrast agents. Nevertheless, frequency filtering requires a distinct separation between transmission and reception which are to be performed with a relatively narrow frequency band. This may cause a low axial resolution, hence a poor discrimination of reflection echoes, caused by neighboring points on the same axis of the line of view On the other hand, while the multiple pulse techniques meet the requirement of very narrow transmit and receive bands, they have the drawback of being affected by motion clutters on received signals.

By combining the two techniques, relatively wider transmit and/or receive passbands may be provided, thanks to multiple pulse techniques, such as Pulse Inversion or the like, thereby obtaining a better resolution and at the same time removing motion clutters thanks to a proper tuning of the resonant circuits which allow coupling with the transducer/s or the probe to the transmitter and/or the receiver.

Also, according to an improvement, since multiple pulse techniques, e.g. the Pulse Inversion technique, allow to remove the reflection signals associated to spurious components, particularly to harmonic components in transmitted pulses, it is sufficient to only connect the receiver through a resonant circuit calibrated to the desired receive frequency, e.g. to the second harmonic frequency.

An ultrasound multiple pulse imaging technique is described in EP 0770352 which was published May 2, 1997.

These multiple pulse techniques may also consist of techniques employing modulated wavelets which provide coding upon transmission and correlated filtering upon reception, wherein the term wavelets includes arbitrary analog signals not having discrete times and amplitudes as well as pulse sequences having discrete times and amplitudes, such as the technique described in U.S. Pat. No. 6,050,947 (issued Apr. 18, 2000 to Rhyne et al.) whose disclosure is expressly incorporated by reference herein.

Alternatively, multiple pulse techniques may also include a Pulse Inversion technique, in which only a few components of the at least two successive transmitted pulses are inverted, whereas the other components are not inverted, the reflected signals of the two successive pulses being summed upon reception. A technique of this type is described in U.S. Pat. No. 5,902,243 whose content is integrated herein by reference.

The invention also relates to an apparatus for transmitting ultrasound pulses and receiving echo signals at a harmonic of the transmission frequency, for example to an ultrasound imaging machine comprising:

a transmitter which generates electric signals for exciting at least one transducer to transmit ultrasound pulses at a predetermined basic frequency, a receiver whereto electric signals are provided from one or more transducers which pick up reflected echo signals at a harmonic frequency, particularly a second harmonic of the frequency of the transmitted pulses and means for removing or drastically attenuating the contributions of harmonic components, particularly those at the second harmonic in transmitted pulses, said means consisting of a resonant circuit which allows to couple the transducer/s to the transmitter, whose resonance frequency is set to the basic frequency of the transmitted pulses.

Particularly, the resonant circuit consists of the assembly composed of the probe, i.e. the transducer/s thereof and the connecting cable, there being provided an inductance for tuning the resonance frequency of said resonant circuit to the basic frequency of the transmitted pulses.

Particularly, the tuning inductance is connected in series to the resistor of the assembly composed of the probe or transducer/s thereof and the output of the transmitter.

The transmitter is a low-impedance generator

In accordance with an additional characteristic, which may be provided as an alternative thereto or in combination therewith, the apparatus includes a resonant circuit for coupling the receiver to the assembly composed of the probe or transducer/s thereof and the connecting cable, which is tuned to a resonance frequency corresponding to a predetermined harmonic, particularly to the second harmonic of the basic frequency of the transmitted pulses.

Advantageously, the resonant circuit consists of the receiver, i.e. of the resistor and the parasitic capacitance thereof.

When the parasitic capacitance of the receiver, besides providing the inductance for tuning the transmitting resonant circuit does not allow to tune the receiving resonant circuit to said harmonic frequency, a compensating capacitor may be provided.

The compensating capacitor is connected in parallel to the parasitic capacitance of the receiver.

Particularly, it is advantageous to provide such a compensating capacitor that the sum of the parasitic capacitance of the receiver and the compensating capacitance substantially corresponds to a quarter of the capacitance of the transmitting resonant circuit, i.e. of the assembly composed of the probe or the transducer/s thereof and the connecting cable.

The advantages of the present invention are self-evident from the above description. The specific inductance for tuning the transmitting resonant circuit may be mounted on the probe-cable assembly. Hence, each probe is adapted regardless of the apparatus, i.e. of the transmitter thereof whereto it will be coupled. The operation is performed on the probe and does not need to account for the transmitter and the characteristics thereof. As a transmitter, a sinusoidal transmitter may be used, which is highly cost-effective.

Typically, the receiving resonant circuit is tuned in a substantially automatic manner, and the specific compensating capacitor of the receiving resonant circuit may be anyway provided thereon. The value of such capacitance may be adjusted by a special control, e.g. thanks to a variable capacitor, in a simple and fast manner. Moreover, it shall be noted that, upon reception, tuning is less critical as regards reception of spurious signals, because, with high-quality transmitted pulses, as regards removal or attenuation of harmonic frequencies, the reflected signals at harmonic frequencies will already have a lower probability of containing harmonic components not due to contrast agents but generated by parasitic effects.

With reference to a further improvement, the apparatus of the invention includes at least one transmitter and at least one transducer having a cable for connecting it to the transmitter and a memory, a control unit and a variable and adjustable inductance, which may be controlled by the control unit, the electric characteristics of the transducer-connecting cable assembly being loaded in the memory together with a software program for reading said electric characteristics and for controlling the inductance to tune the resonant circuit formed by the transducer-connecting cable assembly to the basic frequency of the transmitted pulse, which program is automatically executed upon connection of the transducer-cable assembly to the transmitter by sensors for detecting the electric conditions of the connecting interface between the transducer-cable assembly and the transmitter.

The memory may be steadily mounted in the transducer-cable assembly.

A variant embodiment provides two memories, a first memory being mounted on the transducer-cable assembly, wherein an identification code for said assembly is stored, and a second memory being associated to the transmitter and to the control unit, for storage of all data relating to the electric characteristics of several different transducer-cable assemblies, which are uniquely identified by an identification code, the identification code of each transducer-cable assembly being read upon connection of said assembly, by the control unit, and the data relating to said identification code being searched in the second memory to execute, based on said data, the program for setting the variable inductance to tune the transmitting oscillating resonant circuit.

An additional improvement provides the further combination of an external portable storage medium for storing the electric data of a predetermined transducer-cable assembly and a reader of said medium connected to the control unit, there being provided a program for causing said data to be loaded from the portable storage medium into the second memory when in said second memory no data identified by the identification code of the transducer-cable assembly is present.

In accordance with yet another improvement, the apparatus also includes a receiver and an alternative circuit for connecting the transducer-cable assembly to the transmitter and to the receiver, there being provided an variable capacitor for compensating the parasitic capacitance of the receiver to tune the receiving resonant circuit, and there being provided a software program for controlling the variable capacitor to the proper value to tune the receiving resonant circuit based on the data of the electric characteristics of the transducer-cable assembly connected to the receiver, which is executed by the control unit, in the same manner as the transmit resonant circuit is tuned.

The transducer-cable assembly includes several transducers and is particularly composed of an ultrasound imaging probe and the corresponding connecting cable.

The transmitting and/or receiving apparatus consists of the corresponding unit of an ultrasound imaging machine.

The second memories and the control unit, as well as possibly the reader of the portable storage media are memories, processors and storage media readers which are already included in the ultrasound imaging machine.

Therefore, the invention also relates to an ultrasound imaging probe comprising at least one transducer for turning electric signals into ultrasound transmit pulses, e.g. a piezoelectric transducer and a cable for connecting said probe to an ultrasound imaging apparatus, there being provided an inductance for tuning the resonant circuit formed by the capacitor and the resistor of the probe-cable assembly.

The inductance may be adjustable and controllable by a central unit outside the probe and included, for instance in an ultrasound imaging machine.

Further, the probe and/or the cable for connecting it may include a memory which contains the data relating to at least one unique identification code for said probe-connecting cable assembly and/or the data of the capacitance and resistance values of the equivalent resonant circuit formed by said probe-connecting cable assembly, the memory being readable through the connecting cable by a processing and control unit of an ultrasound imaging machine.

The invention also relates to an ultrasound imaging apparatus including at least one transmitter with a connection interface and at least one ultrasound imaging probe-connecting cable assembly, said interface having an inductance for tuning the resonant circuit formed by said probe-connecting cable assembly.

Also, the ultrasound imaging apparatus includes a processing unit for reading a memory containing all data relating to the electric resistance and capacitance characteristics of the probe-connecting cable assembly, for a predetermined type of such an assembly, to be uniquely defined by an identification code, which sets the value of a variable inductance for tuning said resonant circuit based on said data.

The ultrasound imaging machine also includes a receiver and means for alternatively connecting the probe-connecting cable assembly to the transmitter and to the receiver.

In accordance with an improvement, said ultrasound imaging apparatus includes a capacitor for compensating the parasitic capacitance of the receiver which, upon reception, forms a resonant circuit, to tune said resonant circuit to a predetermined frequency.

Advantageously, said compensating capacitor is variable and is set on the value which allows tuning to the frequency selected, in accordance with the data of the electric characteristics of the probe-cable assembly, by the processing and control unit of the machine.

The present invention further relates to an apparatus for transmitting ultrasound pulses and receiving echo signals as described herein, for instance an ultrasound imaging machine including a transmitter which generates electric signals for exciting at least one transducer to transmit ultrasound pulses at a predetermined basic frequency, a receiver whereto electric signals are provided from one or more transducers which pick up reflected echo signals at a harmonic or sub-harmonic frequency, particularly a second harmonic of the frequency of the transmitted pulses and a resonant circuit through which the transducer/s are coupled to the receiver, whose resonance frequency is set to a harmonic or sub-harmonic frequency of the basic frequency of the transmitted pulses, particularly to a second harmonic of the frequency of the transmitted pulses, there being provided means for transmitting, for each line of view, at least two successive identical or phase-inverted transmission pulses and means for combining the received reflection echoes, caused by said two pulses in the form of a subtraction or a sum of the two reflection echoes respectively, such as a summer or subtracting circuit.

In combination with the above, a device may be provided in which the transducer/s, i.e. the probe, is also coupled to the transmitter through a resonant circuit calibrated to the fundamental frequency of the transmitted pulses.

Said transmitting and/or receiving resonant circuits may be provided as described above and in any of the above combinations and sub-combinations.

SUMMARY OF THE INVENTION

A method for transmitting ultrasound pulses and receiving echo signals at a harmonic of the transmission frequency according to one embodiment of the present invention includes the steps of generating a signal for exciting a transducer to transmit at least one ultrasound pulse at a basic transmission frequency, receiving the reflection echo of the pulse at a harmonic of the frequency of the transmitted pulse wherein any contributions to the harmonic frequency are removed or attenuated in the signal for exciting pulse transmission, the invention being characterized in that the signal for exciting the transducer is filtered or coupled thereto by way of a resonant circuit which is calibrated to the basic frequency. A related embodiment of the present invention comprises an apparatus for practicing the method.

One object of the present invention is to provide an improved method and apparatus for transmitting ultrasound pulses and receiving echo signals at a harmonic of the transmission frequency.

Related objects and advantages of the present invention will be apparent from the following description.

DESCRIPTION OF THE PREFERRED EMBODIMENT

Figure 1:
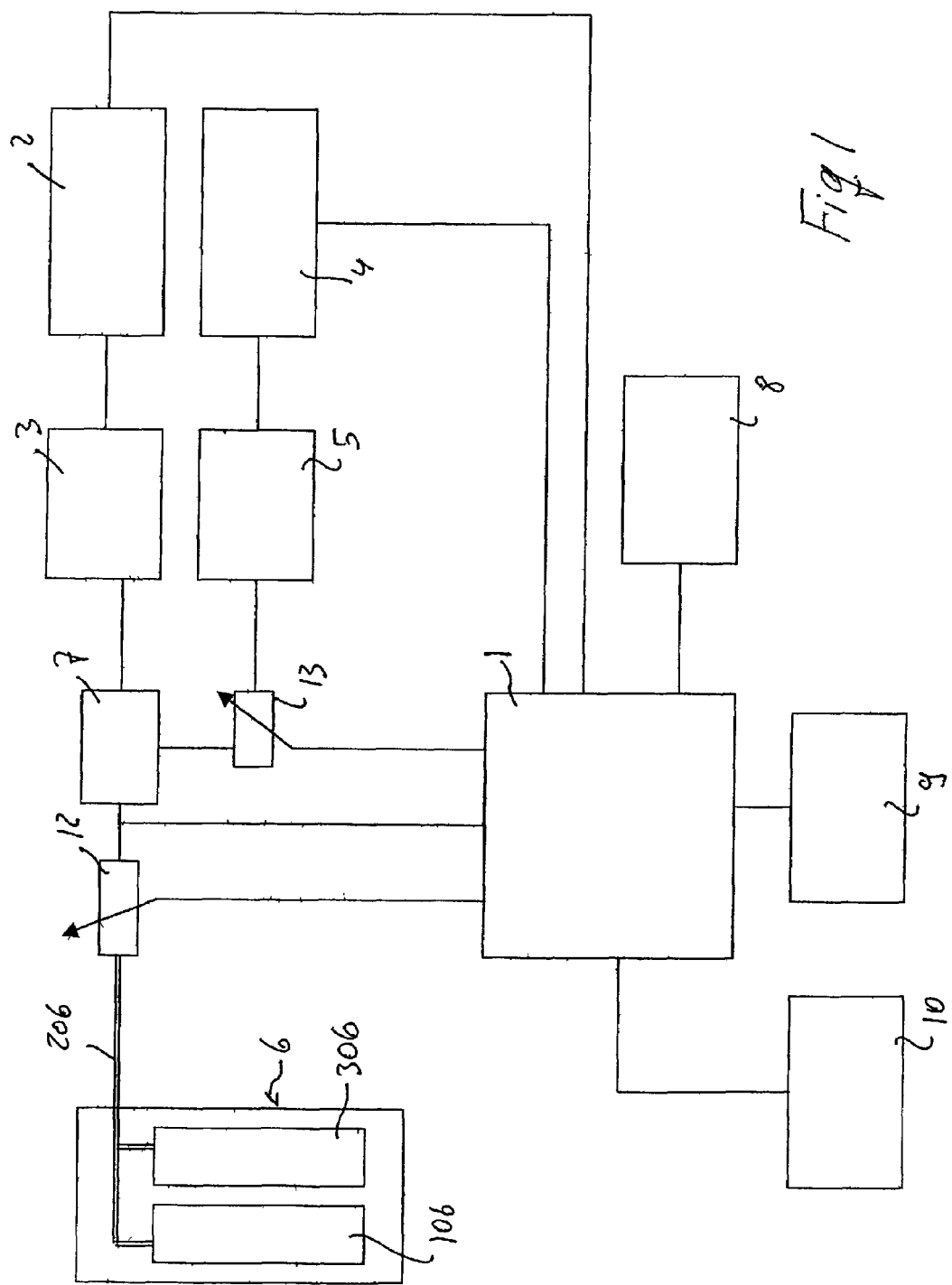
FIG. 1 shows a block diagram of an ultrasound imaging machine according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, an ultrasound imaging apparatus includes a central unit 1 which controls a transmission channel 2 having a transmitter 3. Moreover, the central unit 1 also controls a receiving channel 4 having a receiver 5. The transmitter 3 and the receiver 5 are connected to a probe 6 by means of a switching and ultrasonic beam-forming unit 7.

Memories 8, a display screen 9 and a unit 10 for reading/writing portable storage media are further connected to the central processor unit 1.

The probe 6 includes a plurality of transducers 106 which are connected together by the cable 206. The cable 206 is also connected to the switch 7, hence to the transmitter and the receiver by means of an inductance 12, whereas the probe and the cable are connected to the receiver 5 by means of both the inductance 12 and a capacitor 13 which is inserted in the circuit in parallel with the parasitic capacitance of the receiver 5.

Figure 2:
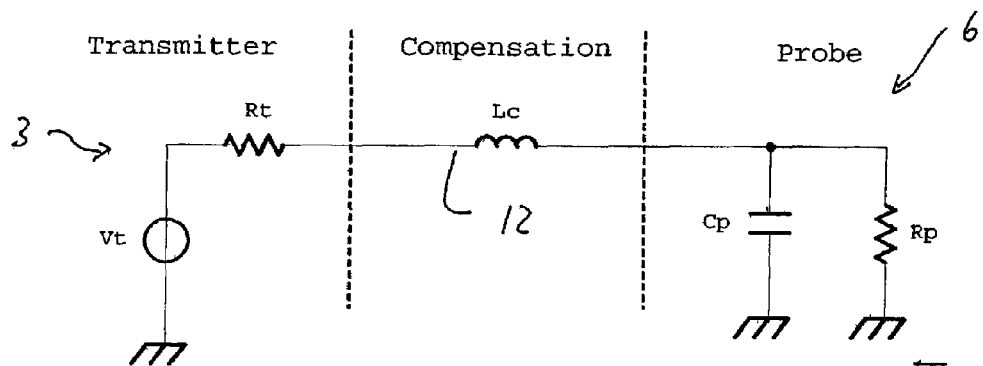
FIG. 2 shows the equivalent diagrams of a transducer-cable assembly and transmitter associated with the FIG. 1 ultrasound imaging machine.
Figure 3:
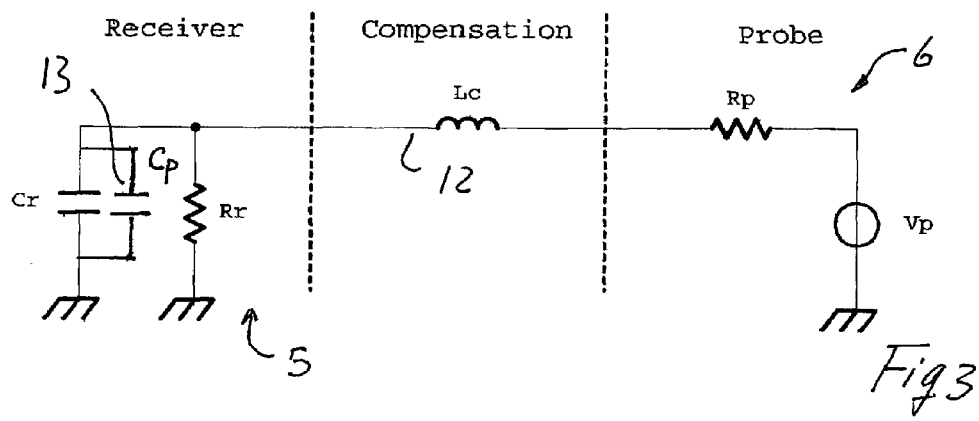
FIG. 3 shows the equivalent diagrams of a transducer-cable assembly and receiver associated with the FIG. 1 ultrasound imaging machine.

FIGS. 2 and 3 show an equivalent circuit upon transmission and reception respectively, i.e. when the switch 7 connects the probe 6 and the cable 206 to the transmitter 3 and the receiver 5 respectively. While the transmission and receiving channels are physically joined by a separator circuit, i.e. the switching unit 7, the equivalent circuits thereof are different. Particularly, upon transmission, the transmitter 3 operates like a low impedance generator, whereas the assembly composed of the probe 6 and the cable 206 actually forms a resonant circuit. Conversely, upon reception, the receiver 5 operates like a resonant circuit, whereas the probe-cable assembly operates like a low to medium impedance generator.

Therefore, due to the above, in order to remove or drastically attenuate the harmonic components, particularly those having a second harmonic frequency in the transmitted ultrasonic pulse and to remove or drastically attenuate the contributions to the received signal having frequencies other than those at a predetermined harmonic of the fundamental transmission frequency, e.g. at the second harmonic, the following tuning condition may be used for oscillating resonant circuits.

By inserting an inductance 12 having an appropriate value between the assembly composed of the probe 6 and the cable 206 and the transmitter 3 and the receiver 5, the corresponding oscillating circuit may be calibrated, i.e. the circuit formed by said probe-cable assembly may be calibrated to the resonance frequency corresponding to the fundamental frequency of transmission pulses, and the circuit formed by the receiver may be calibrated to the selected harmonic of the fundamental transmission frequency, particularly to the second harmonic.

For instance, when considering a basic frequency of 2 MHz, and typical resistance and capacitance values for the assembly composed of the probe 6 and the cable 206 of $C_p=400$ pF (whereof 300 pF due to the ceramic material and 100 pF to the cable); $R_p=400$ O, it is apparent that a compensating inductance Lc of 15 μH causes the transmit circuit to resound at the frequency of 2 MHz.

When further considering typical values of parasitic capacitance and resistance for the receivers 5, such as $R_r=4$ kO; and $C_r=100$ pF, the resonance frequency of the circuit, in combination with said compensating inductance Lc of 15 μH results to be 4 MHz, i.e. at the second harmonic of the fundamental frequency of the transmitted pulse.

If the parasitic capacitance Cr is not such as to allow proper tuning to the second harmonic upon reception, a compensating capacitor Cc may be placed in parallel to Cr, so that Cc+Cr are approximately equal to Cp/4. This allows to maintain the tuning inductance on an optimized value for transmission and to also tune the transmitting resonant circuit.

It is important to notice that the above concepts may be also inverted, i.e. the tuning inductance may be set on the receiver, and a compensating capacitor may be considered which, in combination with said tuning inductance, optimizes tuning of the transmitting resonant circuit.

As mentioned above, the optimized tuning inductance may be directly mounted on the probe-cable assembly, regardless of the specific ultrasound imaging machine, as the transmitting resonant circuit is tuned regardless of the characteristics of the transmitter 3.

Here, each probe-connecting cable assembly would have its own tuning inductance which is determined based on the electric characteristics of said specific assembly.

Regarding the presence of the compensating capacitor, the latter might be set after selecting a predetermined assembly, if the tuning capacitor provided with the probe and the cable could not allow optimized tuning of the receiving resonant circuit.

Advantageously, according to a first improvement, the probe 6 might include a memory 306 for storing the relevant electric data for tuning the receiving resonant circuit, and particularly the value of the compensating inductance associated to the probe and the value of the equivalent capacitor of the probe-cable assembly. When the probe and cable are connected to the ultrasound imaging machine, the central processing unit 1 might read data from the memory 306 of the probe 6. Based on said data, the processing unit 1 may first determine if a compensating capacitor is to be set for the receiving channel. When a compensating capacitor is needed, said processing unit may secondly determine the value of said compensating capacitor and set a variable capacitor provided in the receiving channel parallel to the parasitic capacitance of the receiver 5 to said capacitance value.

However, in accordance with another alternative characteristic, the memory 306 of the probe may only contain one identification code, whereas the memory 8 may contain several tables of data relating to several different probe-cable assemblies, as well as a software program for reading the identification code stored 306 in the probe 6 and for comparing it with the list of identification codes included in the memory 8 and uniquely associated to tables of electric data of the assembly identified by said code whereby, once the data table whose code coincides with the one read from the memory 306 of the probe is found, the procedure of setting the compensating capacitor of the receiving resonant circuit is executed as described above.

If no table is found to correspond to the identification code provided by the probe, the comparing program directly requests data through a message, e.g. displayed on the screen 9 or transmitted by any other means, possibly sound. In this case, a portable magnetic medium may be provided in combination with the probe, with the corresponding data table stored therein, which may be read 10 by the machine by means of a special reader 10, whereby the data may be loaded into the memory 8 and the set up procedure may be executed as described above. The above procedures may be executed in a manner similar to the installation of drivers for computer devices or the like, like plug and play procedures.

As is apparent from FIG. 1, the set up procedure as described above for the compensating capacitor of the resonant circuit in the receiving channel is also applicable to the resonant circuit tuning inductance in the transmission channel.

In this case, the inductance might not be placed on the probe-cable assembly, but at the input of the ultrasound imaging machine. By using a variable inductance, controlled by the central processor 10 on the basis of the electric data of the probe-cable assembly, the ultrasound imaging machine may be arranged to automatically or semiautomatically set said tuning inductance to an optimized value for the probe-cable assembly being used. It shall be noted that, here again, all the above considered options for setting the compensating capacitor to tune the resonant circuit in the receiving channel may be provided. It shall be further noted that, in the same manner as the compensating capacitor may be set to zero, i.e. excluded from the circuit, even the variable tuning inductance provided inside the ultrasound imaging machine may be reduced to zero or by-passed, if the probe already has a tuning inductance integrated thereon, as this would result from the information provided either automatically by the memory integrated in the probe or by the tables contained in the memory of the ultrasound imaging machine, or by the data contained in any portable storage media.

The above description clearly shows the advantages of the invention. First, the invention allows to remove or reduce the spurious signal components upon transmission. Moreover, the resonant circuit may be tuned directly on the probe, regardless of the ultrasound imaging machine in use. The provision of a tuning inductance also has an effect on the receiving channel, which is also similar to a resonant circuit, to be tuned in most cases to the second harmonic resonance frequency already based on the tuning inductance for the transmitting resonant circuit.

The transmitting and/or receiving resonant circuits may be tuned in several possibly automatic or semiautomatic manners. Particularly, by coupling the receiving channel to the probe through a resonant circuit which is tuned or may be tuned to the second harmonic frequency, any contribution to the received signal due to the second harmonic may be separated from those at the fundamental frequency, without using the complex filtering procedures currently required, or anyway limiting the use of said procedures.

Obviously, the method and apparatus of this invention find use in any ultrasound imaging mode, particularly in any ultrasound imaging mode using contrast agents and/or received signals at a harmonic of the fundamental frequency of the transmitted pulses.

The method according to the present invention may be combined with any other kind of ultrasound imaging method for example with a multiple pulse technique employing modulated wavelets which provide coding upon transmission and correlated filtering upon reception, wherein the term wavelets includes arbitrary analog signals not having discrete times and amplitudes as well as pulse sequences having discrete times and amplitudes.

Alternatively the method according to the invention may be combined with a so called Pulse Inversion technique, in which only a few components of the at least two successive transmitted pulses are inverted, whereas the other components are not inverted, the received signals being summed together as described in U.S. Pat. No. 5,706,819 (issued Jan. 13, 1998 to Hwang et al.) which patent is expressly incorporated by reference herein.

A further improvement may provide the method according to the present invention in combination with a multi pulse technique, in which an even number of pulses half of which is inverted with respect of the other half number of the said pulses are transmitted and the received signals relating to all or al least part of these transmitted pulses is summed together. In this case for example for each scan line four pulses are transmitted, two of which are inverted with respect of the other two, the order of transmission of the said four pulses being of any kind, particularly the normal and inverted pulses are transmitted alternatively one to the other or the two inverted pulses are transmitted directly one after the other as the first two, the last two or the intermediate two pulses.

According to yet another variant the method according to the present invention may be combined with an imaging technique providing the emission of two successive transmission pulses and the reception of the two reflection echo signals generated by said transmission pulses and in which means are provided for differentiating the two reflected echo signals from each other.

What is claimed is:

1. A method for transmitting ultrasound pulses and receiving echo signals at a harmonic of the transmission frequency comprising the following steps:
    generating a signal for exciting a plurality of transducers for transmitting at least one ultrasound pulse at a basic transmission frequency;
    receiving a reflection echo of said at least one ultrasound pulse at a harmonic of the frequency of the at least one ultrasound pulse;
    removing any contributions to the harmonic frequency in the signal for exciting;
    filtering the signal for exciting by using a transmitting resonant circuit having a resonance frequency which is adjusted to the basic transmission frequency, wherein an assembly of the plurality of transducers and a cable connecting said plurality to a transmitter that is constructed and arranged for performing said generating step is constructed and arranged as said transmitting resonant circuit, the assembly having a resonance frequency;
    providing a variable inductance in series between the cable and the transmitter for calibrating the resonance frequency of the assembly to said the transmission frequency; and
    automatically adjusting the variable inductance based on electrical characteristics of the assembly.

2. A method for transmitting ultrasound pulses and receiving echo signals at a harmonic of the transmission frequency comprising the following steps:
    generating a signal for exciting a plurality of transducers for transmitting at least one ultrasound pulse at a basic transmission frequency;
    receiving a reflection echo of said at least one ultrasound pulse at a harmonic of the frequency of the at least one ultrasound pulse;
    removing any contributions to the harmonic frequency in the signal for exciting;
    filtering the signal for exciting by using a transmitting resonant circuit having a resonance frequency which is adjusted to the basic transmission frequency, wherein an assembly of the plurality of transducers and a cable connecting said plurality to a transmitter that is constructed and arranged for performing said generating step is constructed and arranged as said transmitting resonant circuit; and
    inserting an inductance in series between the cable and the transmitter for adjusting the resonance frequency to the basic transmission frequency;
    connecting said plurality of transducers to a receiver through a receiving resonant circuit;
    calibrating said receiving resonant circuit to the second harmonic of the basic transmission frequency; and configuring said receiving resonant circuit for operating upon reception, in a resonant circuit mode with predetermined resistance and capacitance values.

3. An apparatus constructed and arranged for transmitting ultrasound pulses at a transmission frequency and receiving echo signals at a harmonic of said transmission frequency, said apparatus comprising:
    a transmitter constructed and arranged for generating electric signals for exciting at least one transducer for transmitting ultrasound pulses at a predetermined basic frequency;
    a transducer constructed and arranged for picking up reflected echo signals at a harmonic frequency of said ultrasound pulses;
    a receiver connected to said transducer for receiving electric signals from said transducers;
    means for removing contributions of harmonic components in said transmitted ultrasound pulses, said means including a resonant circuit which is a part of the connection of said transducer to the transmitter, said resonant circuit having a resonance frequency which is set to the basic frequency of the transmitted ultrasound pulses, wherein said resonant circuit includes the combination of said transducer and a connecting cable which connects the transducer to the transmitter;
    a variable inductance positioned in series between the connecting cable and the transmitter for adjusting the frequency of the resonant circuit to the basic frequency; and
    means for automatically adjusting the variable inductance based on electrical characteristics of the resonant circuit.

4. The apparatus of claim 3, wherein the combination of said transducer and the connecting cable is alternatively connected to the transmitter and to the receiver through switching means.

5. The apparatus of claim 3 wherein said harmonic frequency is the second harmonic.

6. The apparatus of claim 3 which further includes a receiving resonant circuit and a receiving inductance positioned in series with said receiver.

7. The apparatus of claim 6, wherein the resonant circuit is a transmitting resonant circuit and wherein the inductance for the transmitting resonant circuit and the inductance for the receiving resonant circuit have identical values.

8. An apparatus for transmitting ultrasound pulses and receiving echo signals comprising:
    a transmitter constructed and arranged for generating electric signals for exciting at least one transducer for transmitting ultrasound pulses at a predetermined basic frequency;
    a transducer constructed and arranged for picking up reflected echo signals at a harmonic frequency of said ultrasound pulses;
    a receiver connected to said transducer for receiving electric signals from said transducer;
    a resonant circuit through which said transducer is coupled to the receiver, said resonant circuit having a resonance frequency which is set to a harmonic or sub-harmonic frequency of the basic frequency of the transmitted pulses;
    means for transmitting, for each line of view, at least two successive identical or phase-inverted transmission pulses; and
    means for combining the received reflection echoes, caused by said two pulses in the form of a subtraction or a sum of the two reflection echoes respectively, such as a summer or subtracting circuit, said transducer being coupled to the transmitter through a resonant circuit calibrated to the fundamental frequency of the transmitted pulses.

* * * * *